United States Patent
Wells

(10) Patent No.: US 11,760,126 B2
(45) Date of Patent: Sep. 19, 2023

(54) HUBCAP LIGHTING SYSTEM

(71) Applicant: Javier Wells, San Antonio, TX (US)

(72) Inventor: Javier Wells, San Antonio, TX (US)

( * ) Notice: Subject to any disclaimer, the term of this patent is extended or adjusted under 35 U.S.C. 154(b) by 0 days.

(21) Appl. No.: 17/567,195

(22) Filed: Jan. 3, 2022

(65) Prior Publication Data

US 2022/0314689 A1 Oct. 6, 2022

Related U.S. Application Data

(60) Provisional application No. 63/168,355, filed on Mar. 31, 2021.

(51) Int. Cl.
| | |
|---|---|
| *B60B 7/00* | (2006.01) |
| *F21S 9/03* | (2006.01) |
| *F21Y 115/10* | (2016.01) |
| *B60B 7/06* | (2006.01) |
| *B60R 16/033* | (2006.01) |
| *F21Y 113/10* | (2016.01) |

(52) U.S. Cl.
CPC .............. *B60B 7/006* (2013.01); *F21S 9/03* (2013.01); *B60B 7/06* (2013.01); *B60R 16/033* (2013.01); *F21Y 2113/10* (2016.08); *F21Y 2115/10* (2016.08)

(58) Field of Classification Search
CPC ... B60B 7/006; B60B 7/06; F21S 9/03; B60R 16/033; F21Y 2113/10; F21Y 2115/10
See application file for complete search history.

(56) References Cited

U.S. PATENT DOCUMENTS

| | | | | |
|---|---|---|---|---|
| 3,155,430 | A * | 11/1964 | Schindler | B60B 7/20 40/587 |
| 5,634,707 | A * | 6/1997 | Bailey, Jr. | F21V 33/008 362/500 |
| 5,683,164 | A * | 11/1997 | Chien | B60Q 1/326 362/802 |
| 6,116,762 | A * | 9/2000 | Kutlucinar | B60Q 1/326 362/500 |
| 6,220,733 | B1 * | 4/2001 | Gordon | B60Q 1/326 362/500 |
| 6,926,369 | B2 * | 8/2005 | McCaster, III | B60B 7/0013 301/37.109 |
| 7,001,053 | B1 * | 2/2006 | Chieh | B62J 6/20 362/500 |
| 7,703,958 | B2 * | 4/2010 | Christoff | B60Q 1/326 362/543 |
| 8,727,452 | B2 * | 5/2014 | Merten | B60B 7/0026 301/37.42 |

(Continued)

*Primary Examiner* — Tsion Tumebo
(74) *Attorney, Agent, or Firm* — Brennan, Manna & Diamond, LLC

(57) ABSTRACT

An illumination system for a vehicle wheel. A lighting component is attached to a hubcap, a wheel center hubcap, or both. The lighting component may be externally attached or embedded, or attached to a back side of the hubcap, the wheel center hubcap, or both. The lighting component may be a plurality of LED lights configured to illuminate an area external to the hubcap or wheel center hubcap. The lighting component may emit a single color or multiple colors of light either continuously or in a pattern. The lighting component is solar powered and may employ a battery backup. The illumination system may be controlled via a switch or wirelessly with an external controller or via a mobile application.

14 Claims, 6 Drawing Sheets

(56) References Cited

U.S. PATENT DOCUMENTS

| | | | |
|---|---|---|---|
| 9,266,386 B2* | 2/2016 | Wang | B60B 7/0013 |
| 9,868,318 B2* | 1/2018 | Becker | B60B 7/006 |
| 10,052,910 B2* | 8/2018 | Moore | H02K 11/042 |
| 2005/0099820 A1* | 5/2005 | Cooper | B60Q 1/326 |
| | | | 362/500 |
| 2005/0212348 A1* | 9/2005 | Cheng | B60B 7/08 |
| | | | 301/37.108 |
| 2008/0101053 A1* | 5/2008 | Hoffman | G09F 21/045 |
| | | | 345/82 |
| 2009/0058177 A1* | 3/2009 | Berens | B60B 7/20 |
| | | | 301/37.25 |
| 2010/0014303 A1* | 1/2010 | Wang | B60Q 1/326 |
| | | | 362/500 |
| 2014/0254821 A1* | 9/2014 | Boyce | H04R 1/023 |
| | | | 381/86 |

* cited by examiner

HUBCAP LIGHTING SYSTEM

CROSS-REFERENCE TO RELATED APPLICATION

The present application claims priority to, and the benefit of, U.S. Provisional Application No. 63/168,355, which was filed on Mar. 31, 2021 and is incorporated herein by reference in its entirety.

FIELD OF THE INVENTION

The present invention generally relates to a vehicle illumination system, and more specifically to a lighting system for illuminating vehicle hubcaps. Accordingly, the present specification makes specific reference thereto. However, it is to be appreciated that aspects of the present invention are also equally amenable to other like applications, devices, and methods of manufacture.

BACKGROUND

Hubcaps are the decorative disks on a vehicle wheel that covers at minimum the central portion of the wheel, called the hub. An automobile hubcap is used to cover the wheel hub and the wheel fasteners to reduce the accumulation of dirt and moisture. They are also used as decorative accessories for vehicles. A "hubcap" is technically the small cover over the center of the wheel, while a "wheel cover" is a decorative metal or plastic disk that snaps, bolts onto. Or otherwise attaches to and covers the entire face of the wheel. Cars with stamped steel wheels often use a full wheel cover that conceals the entire wheel. Cars with alloy wheels or styled steel wheels generally use smaller hubcaps called center caps.

There are a wide variety and number of hubcaps available as original equipment for vehicles of all types. Plastic has now largely replaced steel as the primary material for manufacturing hubcaps and trims. On modern automobiles, full-wheel hubcaps are most commonly seen on cheaper models and base trim levels. Higher end and performance-oriented vehicles typically use alloy wheels. However, even modern aluminum alloy wheels generally use small removable center caps, similar in size to the earliest hubcaps.

Individuals are always looking for ways to personalize their vehicles. Many vehicles end up looking generic because of a lack of exciting options. Teenagers especially want their vehicles to be unique and personalized. Motor enthusiasts of all ages are also always looking for ways to set their vehicle apart from others. Accordingly, there is a great need for additional ways to personalize or decorate a vehicle. There is also a need for a way for a way to illuminate vehicle wheels. Similarly, there is a need for a means of illuminating an area adjacent to a vehicle wheel. Further, there is a need for a way to illuminate a vehicle wheel without batteries even when the vehicle is not in motion.

In this manner, the improved hubcap lighting system of the present invention accomplishes all of the forgoing objectives, thereby providing an easy solution for customizing a vehicle. A primary feature of the present invention is a non-battery powered way to illuminate hubcaps. The present invention allows the user to customize exterior vehicle lighting. Finally, the improved external vehicle illumination system of the present invention is capable of illuminating an area adjacent to a vehicle wheel even when the vehicle is not in motion.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a hubcap lighting system. The hubcap lighting system is configured to attach to a vehicle wheel to conceal or partially conceal a wheel rim and provide illumination around the vehicle wheel. The vehicle wheel may be any vehicle wheel system or rim that can use a hubcap or wheel hub center cap.

The hubcap lighting system comprises a wheel hub center cap. The wheel hub center cap is manufactured from a rigid or semi-rigid material and is circular is shape. The wheel hub center cap may be translucent or transparent. The wheel hub center cap comprises an attachment component. The attachment component is attached to or extends from a back side surface of the wheel hub center cap. The attachment component is configured to secure the wheel hub center cap to the vehicle wheel. The wheel hub center cap covers a center bore of the vehicle wheel.

The hubcap lighting system further comprises a lighting component. The lighting component is configured to provide illumination external to the wheel hub center cap. The lighting component may be embedded within or attached to an exterior surface of the wheel hub center cap. Alternatively, the lighting component may be attached to a back side of the wheel hub center cap. The lighting component comprises a plurality of light sources. The plurality of light sources may emit light in one or more colors.

The hubcap lighting system further comprises a solar power component. The solar power component is in electrical communication with the lighting component. The solar power component comprises a solar cell. The solar cell is attached to or embedded within the exterior surface of the wheel hub center cap. The solar power component may further comprise a battery. The hubcap lighting system may further comprise a control component. The control component may be in wireless communication with the lighting component. The control component is configured to control operation of the lighting component.

In an additional embodiment, a hubcap lighting system comprises a hubcap. The hubcap is manufactured from a rigid or semi-rigid material and is circular is shape. The hubcap may be translucent or transparent. The hubcap comprises an attachment component. The attachment component is attached to or extends from a back side surface of the hubcap. The attachment component is configured to secure the hubcap to the vehicle wheel. The hubcap covers a hub of the vehicle wheel.

The hubcap lighting system further comprises a lighting component. The lighting component is configured to provide illumination external to the hubcap. The lighting component may be embedded within or attached to an exterior surface of the hubcap. Alternatively, the lighting component may be attached to a back side of the hubcap. The lighting component comprises a plurality of light sources. The plurality of light sources may emit light in one or more colors.

The hubcap lighting system further comprises a solar power component. The solar power component is in electrical communication with the lighting component. The solar power component comprises a solar cell. The solar cell is attached to or embedded within the exterior surface of the hubcap. The solar power component may further comprise a battery. The hubcap lighting system may further comprise a control component. The control component may be in wired or wireless communication with the lighting component. The control component is configured to control operation of the lighting component.

In an additional embodiment, a hubcap lighting system comprises a hubcap. The hubcap is manufactured from a rigid or semi-rigid material and is circular is shape. The hubcap may be translucent or transparent. The hubcap comprises an attachment component. The hubcap further comprises a center opening. The attachment component is attached to or extends from a back side surface of the hubcap. The attachment component is configured to secure the hubcap to the vehicle wheel. The hubcap covers a hub of the vehicle wheel.

The hubcap lighting system further comprises a wheel hub center cap. The wheel hub center cap is manufactured from a rigid or semi-rigid material, is circular is shape, and is smaller in diameter than the hubcap. The wheel hub center cap may be translucent or transparent. The wheel hub center cap comprises an attachment component. The attachment component is attached to or extends from a back side surface of the wheel hub center cap. The attachment component is configured to secure the wheel hub center cap to the hubcap. The wheel hub center cap fits into and is retained within the center opening of the hubcap.

The hubcap lighting system further comprises a lighting component. The lighting component is configured to provide illumination external to the hubcap and the wheel hub center cap. The lighting component may be embedded within or attached to an exterior surface of the hubcap or an exterior surface the wheel hub center cap. Alternatively, the lighting component may be attached to a back side of the hubcap or a back side of the wheel hub center cap. The lighting component comprises a plurality of light sources. The plurality of light sources may emit light in one or more colors.

The hubcap lighting system further comprises a solar power component. The solar power component is in electrical communication with the lighting component. The solar power component comprises a solar cell. The solar cell is attached to or embedded within the exterior surface of the hubcap or the exterior surface of the wheel hub center cap. The solar power component may further comprise a battery. The hubcap lighting system may further comprise a control component. The control component may be in wired or wireless communication with the lighting component. The control component is configured to control operation of the lighting component.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
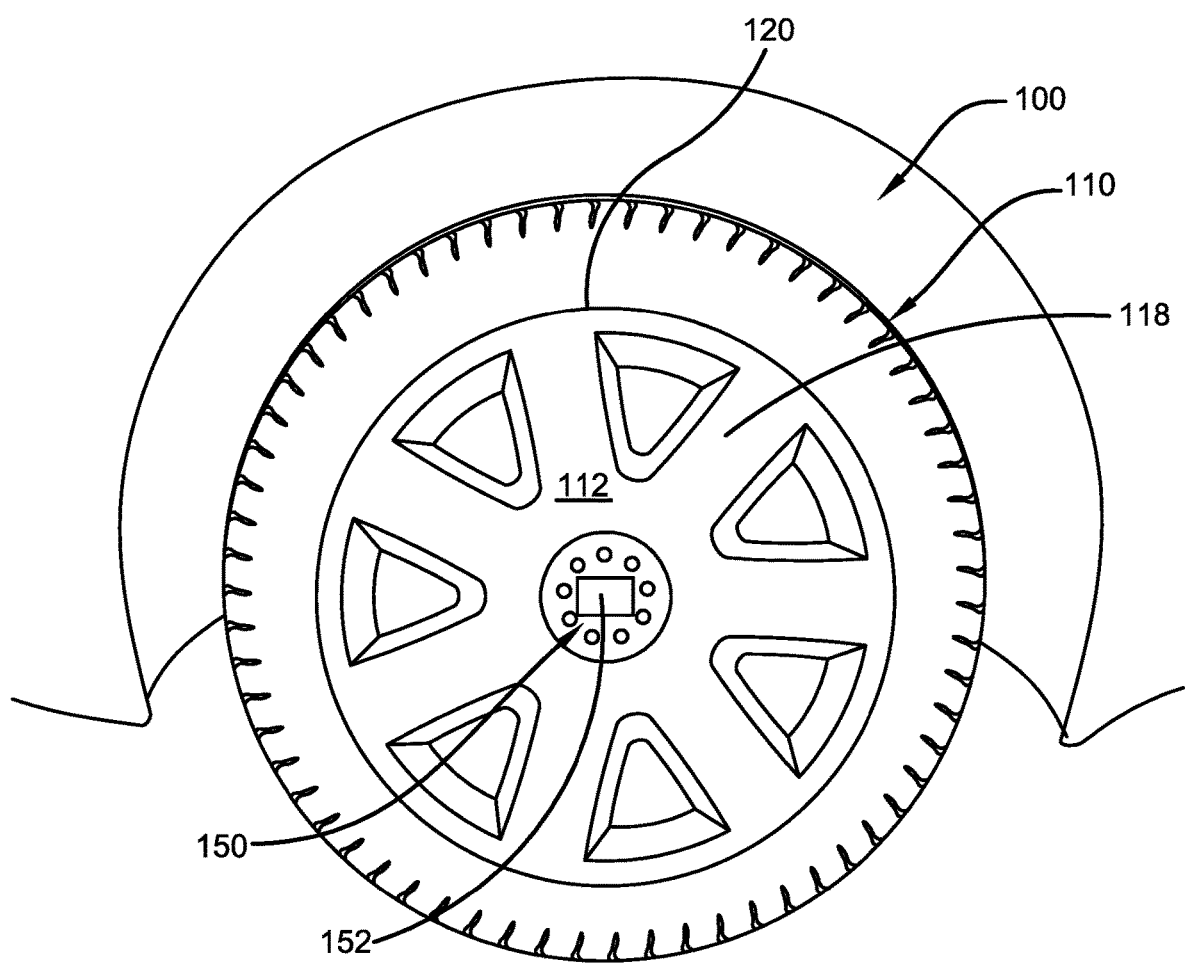
FIG. 1 illustrates a perspective view of one potential embodiment of a hubcap lighting system of the present invention for a vehicle wheel in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They do not intend as an exhaustive description of the invention or do not limit the scope of the invention. Additionally, an illustrated embodiment need not have all the aspects or advantages shown. Thus, in other embodiments, any of the features described herein from different embodiments may be combined.

The present invention, in one exemplary embodiment, is a lighting or illumination system for vehicle hubcaps that enables users to personalize their vehicle. The lights may be manufactured in a variety of colors and are configured to illuminate an area external to the hubcap continuously or in a pattern. The system includes solar lights that can be placed in the middle or center of the hubcaps and may have a battery backup. The LED lights may also be placed inside or behind the hubcaps of the vehicle. A mobile app or wireless remote controller can be used to control the light options, including colors and patterns.

The hubcap lighting system is useful for personalizing, customizing, or decorating an automobile or any vehicle that may employ hubcaps. The hubcap lighting system can provide adaptable visual display depending on the desire of the user. The hubcap lighting system further provides illumination around the vehicle wheels in dark or low light conditions enhancing user safety. A user can easily see if there is damage to a tire or any other safety hazards in the vicinity without the need for an additional light source.

Referring initially to the drawings, FIGS. 1-7 illustrate hubcap lighting system 100. The hubcap lighting system 100 is for use with a vehicle wheel. The hubcap lighting system 100 is configured to attach to a vehicle wheel and conceal part or all of a wheel rim. The vehicle wheel may be any vehicle wheel system or rim that can use a hubcap or wheel hub center cap. A wheel hub center cap is a small metal or plastic disk positional in the middle of a wheel. Wheel center caps are also called center hub caps.

Figure 2:
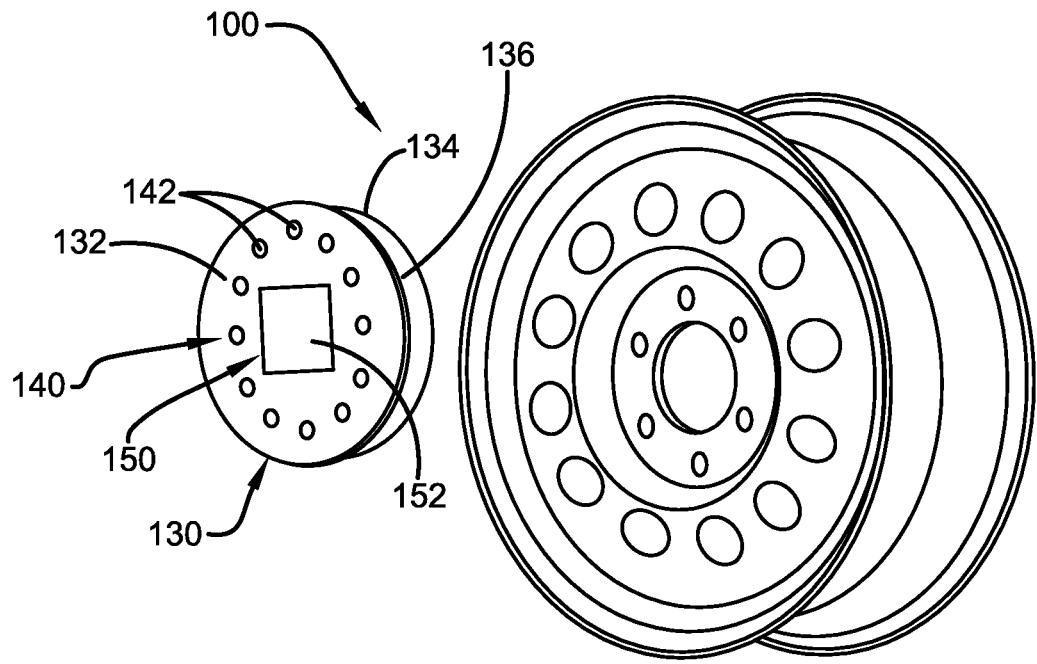
FIG. 2 illustrates an exploded view of a wheel hub center cap of one potential embodiment of the hubcap lighting system of the present invention detached from the vehicle wheel in accordance with the disclosed architecture.
Figure 3:
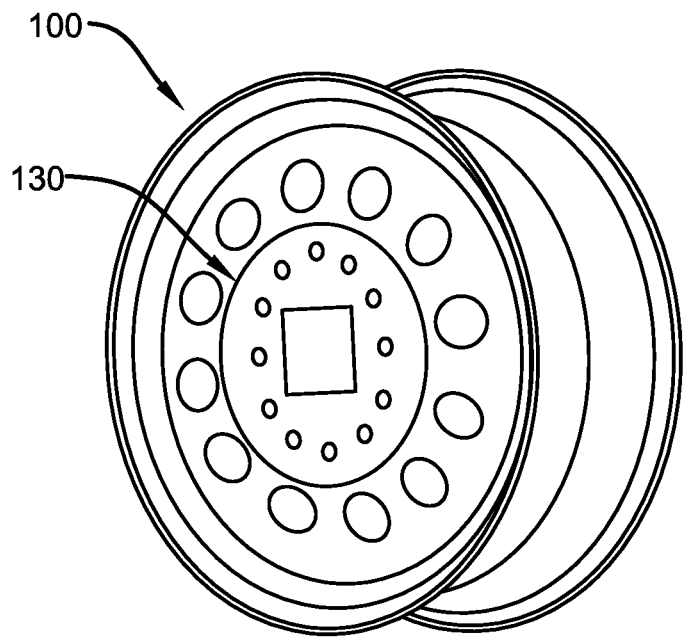
FIG. 3 illustrates a perspective view of the wheel hub center cap of one potential embodiment of the hubcap lighting system of the present invention attached to the vehicle wheel in accordance with the disclosed architecture.
Figure 6:
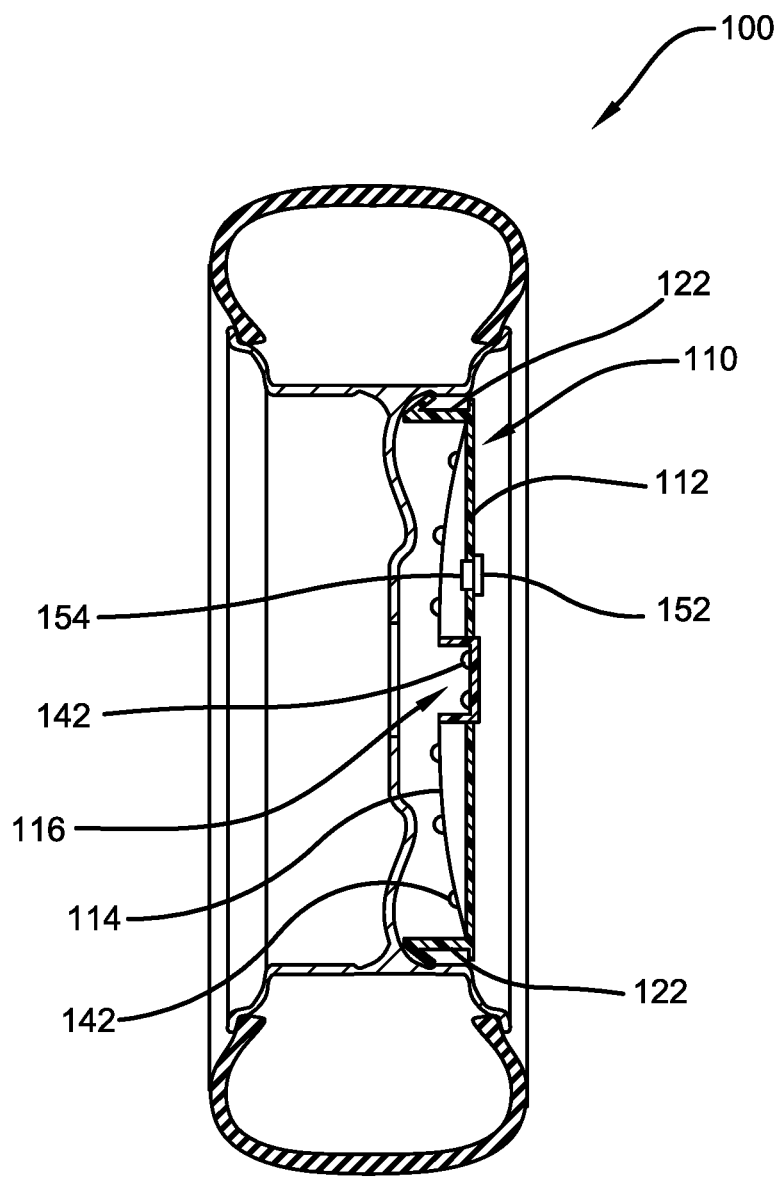
FIG. 6 illustrates a side sectional view of one potential embodiment of the hubcap lighting system of the present invention for a vehicle wheel in accordance with the disclosed architecture.

As illustrated in FIGS. 2 and 3, the hubcap lighting system 100 comprises a wheel hub center cap 130. The wheel hub center cap 130 is manufactured from a rigid or semi-rigid material, such as plastic or metal, and is generally circular is shape. The wheel hub center cap 130 may be opaque, translucent, or transparent. The wheel hub center cap 130 comprises an exterior surface 132 and a back side surface 134 as illustrated in FIG. 6. The wheel hub center cap 130 further comprises an attachment component 136. The attachment component 136 is attached to or extends from the back side surface 134 of the wheel hub center cap 130. The attachment component 136 may be prongs, a ring, spring clips, or the like, and is configured to secure the wheel hub center cap 130 to the vehicle wheel. The wheel hub center cap 130 generally covers a center bore of the vehicle wheel when in place as illustrated in FIG. 3.

The hubcap lighting system 100 further comprises a lighting component 140. The lighting component 140 is configured to provide illumination external to the wheel hub center cap 130. The lighting component 140 may be embedded or molded within the exterior surface 132 of the wheel hub center cap 130. The lighting component 140 may also be attached to the exterior surface 132 of the wheel hub center cap 130 with adhesives, magnetically, or with mechanical fasteners. Alternatively, the lighting component 140 may be attached to the back side surface 134 of the wheel hub center cap 130. This would allow illumination to show through a translucent or transparent wheel hub center cap 130.

Figure 4:
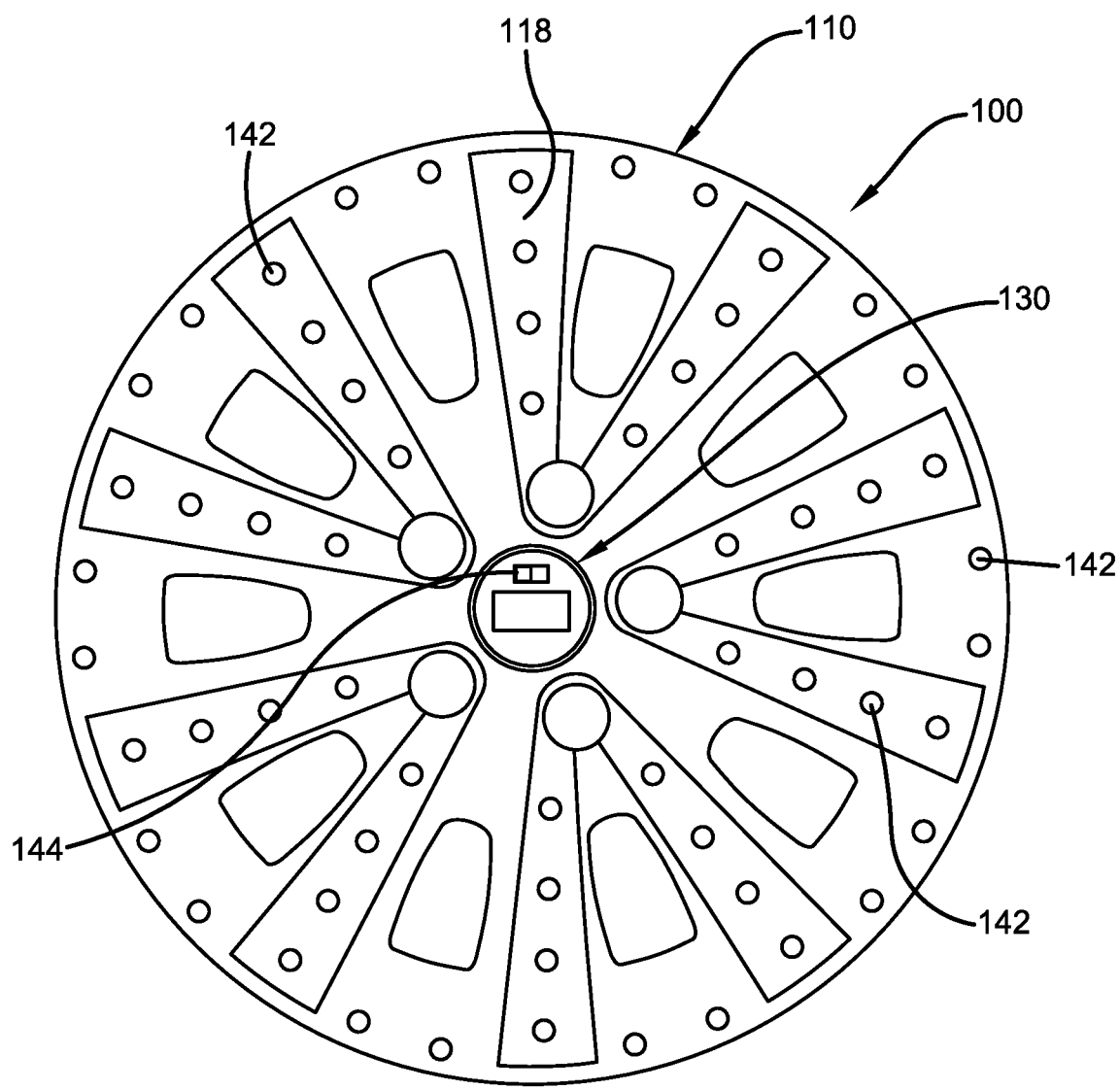
FIG. 4 illustrates a front view of a hubcap of one potential embodiment of the hubcap lighting system of the present invention in accordance with the disclosed architecture.

The lighting component 140 comprises a plurality of light sources 142. The plurality of light sources 142 may emit light in one or more colors. The plurality of light sources 142 may be a plurality of light emitting diodes (LED's). The LEDS may be able to emit constant light or intermittent light. The lighting component 140 may further comprise a control switch 144 as illustrated in FIG. 4. The control switch 144 may be located on the exterior surface 132 of the wheel hub center cap 130. The control switch 144 may be configured to turn the lighting component 140 on/off or control the illumination.

The hubcap lighting system 100 further comprises a solar power component 150. The solar power component 150 is in electrical communication with the lighting component 140 and is adapted power the lighting component 140. The solar power component 150 comprises a solar cell 152. The solar cell 152 is attached to or embedded within the exterior surface 132 of the wheel hub center cap 130. The solar power component 150 may further comprise a battery 154 to store power for low-light conditions.

Figure 7:
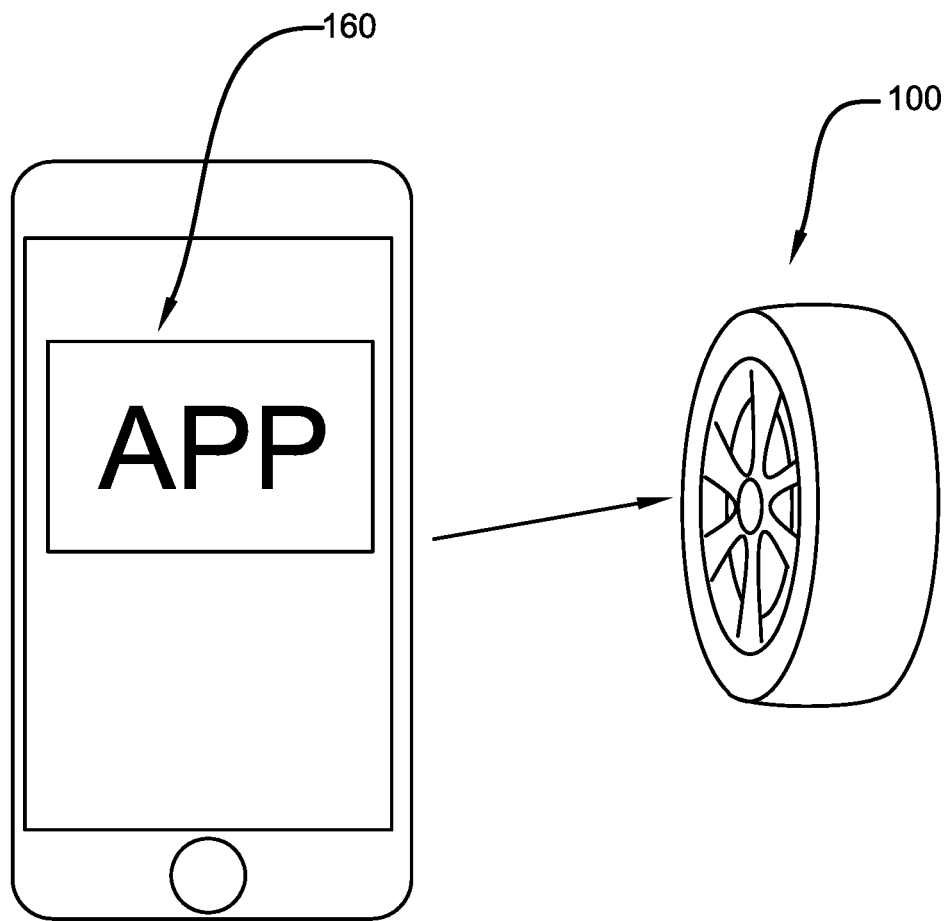
FIG. 7 illustrates a perspective view of a control component of one potential embodiment of the hubcap lighting system of the present invention for a vehicle wheel, wherein the hubcap lighting system is activated in accordance with the disclosed architecture.

The hubcap lighting system 100 may further comprise a control component 160 as illustrated in FIG. 7. The control component 160 may be in wireless communication with the lighting component 140. The control component 160 is configured to control operation of the lighting component 140. The control component 160 may be a wireless remote controller or may be a mobile application useable with a mobile electronic device, such as a smartphone.

In an additional embodiment as illustrated in FIGS. 1 and 4, a hubcap lighting system 100 comprises a hubcap 110. The hubcap 110 is manufactured from a rigid or semi-rigid material, such as plastic or metal, and is generally circular is shape. The hubcap 110 may be opaque, translucent, or transparent. As illustrated in FIG. 6, the hubcap 110 comprises an exterior surface 112 and a backside surface 114. The hubcap 110 further comprises an attachment component 122. The attachment component 122 is attached to or extends from the back side surface 114 of the hubcap 110. The attachment component 122 may be prongs, a ring, spring clips, or the like, and is configured to secure the hubcap 110 to the vehicle wheel. The hubcap 110 generally covers a hub of the vehicle wheel when in place. The hubcap 110 may further comprise a center opening 116, a plurality of spokes 118, and a perimeter 120.

The hubcap lighting system 100 further comprises a lighting component 140. The lighting component 140 is configured to provide illumination external to the hubcap 110. The lighting component 140 may be embedded or molded within the exterior surface 112 of the hubcap 110. The lighting component 140 may also be attached to the exterior surface 112 of the hubcap 110 with adhesives, magnetically, or with mechanical fasteners. Alternatively, the lighting component 140 may be attached to the back side surface 114 of the hubcap 110. This would allow illumination to show through a translucent or transparent hubcap 110.

The lighting component 140 comprises a plurality of light sources 142. The plurality of light sources 142 may emit light in one or more colors. The plurality of light sources 142 may be a plurality of light emitting diodes (LED's). The LEDS may be able to emit constant light or intermittent light. The plurality of light sources 142 may be positioned adjacent to the perimeter 120 or arranged in a spoke pattern along the spokes 118 of the hubcap 110, or in any combination of patterns.

The lighting component 140 may further comprise a control switch 144. The control switch 144 may be located on the exterior surface 112 of the hubcap 110. The control switch 144 may be configured to turn the lighting component 140 on/off or control the illumination.

The hubcap lighting system 100 further comprises a solar power component 150. The solar power component 150 is in electrical communication with the lighting component 140 and is adapted power the lighting component 140. The solar power component 150 comprises a solar cell 152. The solar cell 152 is attached to or embedded within the exterior surface 112 of the hubcap 110. The solar power component 150 may further comprise a battery 154 to store power for use during low-light conditions or at night.

The hubcap lighting system 100 may further comprise a control component 160 as illustrated in FIG. 7. The control component 160 may be in wireless communication with the lighting component 140. The control component 160 may be RFID enabled and is configured to control operation of the lighting component 140. The control component 160 may be a wireless remote controller or may be a mobile application useable with a mobile electronic device, such as a smartphone.

Figure 5:
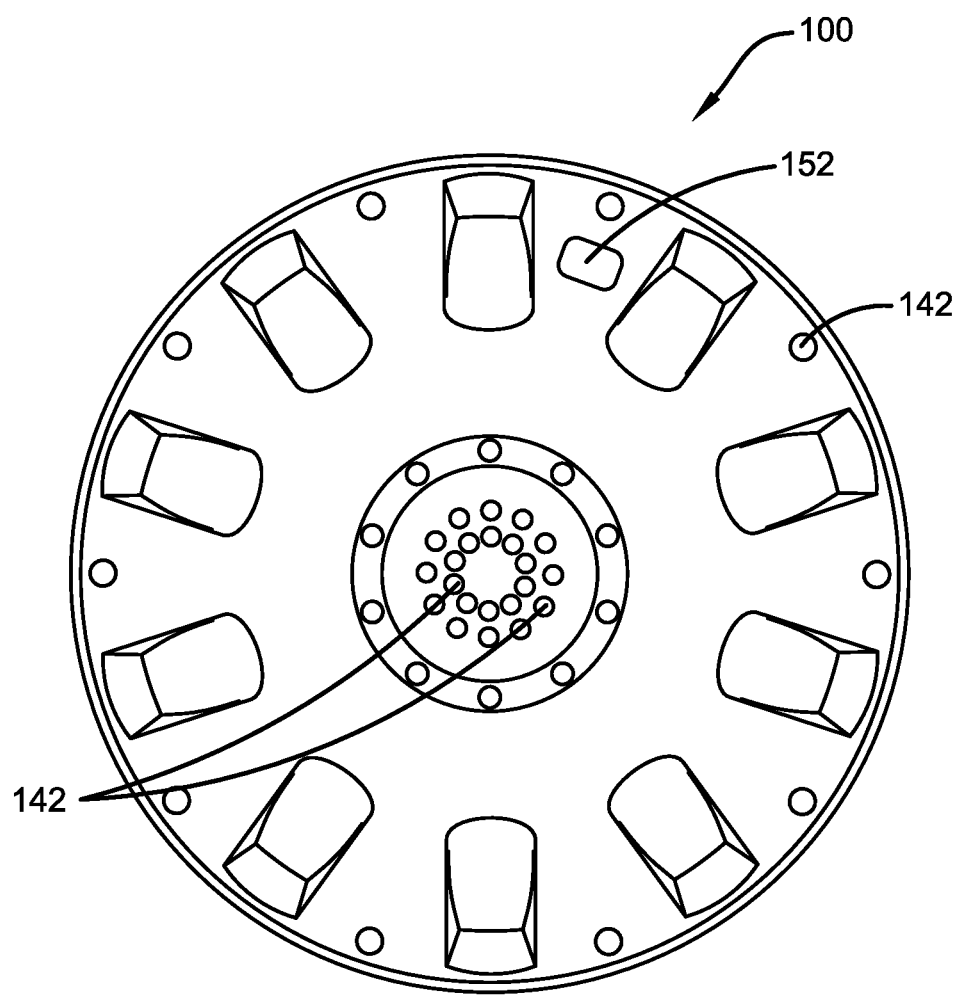
FIG. 5 illustrates a perspective view of one potential embodiment of the hubcap lighting system of the present invention for a vehicle wheel in accordance with the disclosed architecture.

In an additional embodiment as illustrated in FIGS. 1 and 5, a hubcap lighting system 100 comprises a hubcap 110. The hubcap 110 is manufactured from a rigid or semi-rigid material, such as plastic or metal, and is generally circular is shape. The hubcap 110 may be opaque, translucent, or transparent. As illustrated in FIG. 6, the hubcap 110 comprises an exterior surface 112 and a backside surface 114.

The hubcap 110 further comprises an attachment component 122. The attachment component 122 is attached to or extends from the back side surface 114 of the hubcap 110. The attachment component 122 may be prongs, a ring, spring clips, or the like, and is configured to secure the hubcap 110 to the vehicle wheel. The hubcap 110 generally covers a hub of the vehicle wheel when in place. The hubcap 110 may further comprise a center opening 116, a plurality of spokes 118, and a perimeter 120.

The hubcap lighting system 100 further comprises a wheel hub center cap 130. The wheel hub center cap 130 is manufactured from a rigid or semi-rigid material, such as plastic or metal, and is generally circular is shape. The wheel hub center cap 130 may be opaque, translucent, or transparent. The wheel hub center cap 130 comprises an exterior surface 132 and a back side surface 134. The wheel hub center cap 130 further comprises an attachment component 136. The attachment component 136 is attached to or extends from the back side surface 134 of the wheel hub center cap 130. The attachment component 136 may be prongs, a ring, spring clips, a magnetic attachment, or the like, and is configured to secure the wheel hub center cap 130 to the hubcap 110. The wheel hub center cap 130 fits into and is retained within the center opening 116 of the hubcap 110.

The hubcap lighting system 100 further comprises a lighting component 140. The lighting component 140 is configured to provide illumination external to the hubcap 110 and the wheel hub center cap 130. The lighting component 140 may be embedded or molded within the exterior surface 112 of the hubcap 110 or the exterior surface 132 of the wheel hub center cap 130. The lighting component 140 may also be attached to the exterior surface 112 of the hubcap 110 or the exterior surface 132 of the wheel hub center cap 130 with adhesives, magnetically, or with mechanical fasteners. Alternatively, the lighting component 140 may be attached to the back side surface 114 of the hubcap 110 or the back side surface 134 of the wheel hub center cap 130. This would allow illumination to show through a translucent or transparent hubcap 110 or wheel hub center cap 130.

The lighting component 140 comprises a plurality of light sources 142. The plurality of light sources 142 may emit light in one or more colors. The plurality of light sources 142 may be a plurality of light emitting diodes (LED's). The LEDS may be able to emit constant light or intermittent light. The lighting component 140 may further comprise a control switch 144 as illustrated in FIG. 4. The control switch 144 may be located on the exterior surface 112 of the hubcap 110 or the exterior surface 132 of the wheel hub center cap 130. The control switch 144 may be configured to turn the lighting component 140 on/off or control the illumination.

The hubcap lighting system 100 further comprises a solar power component 150. The solar power component 150 is in electrical communication with the lighting component 140 and is adapted power the lighting component 140. The solar power component 150 comprises a solar cell 152. The solar cell 152 is attached to or embedded within the exterior surface 112 of the hubcap 110 or the exterior surface 132 of the wheel hub center cap 130. The solar power component 150 may further comprise a battery 154 to store power for low-light conditions.

The hubcap lighting system 100 may further comprise a control component 160 as illustrated in FIG. 7. The control component 160 may be in wireless communication with the lighting component 140. The control component 160 may be RFID enabled and is configured to control operation of the lighting component 140. The control component 160 may be a wireless remote controller or may be a mobile application useable with a mobile electronic device, such as a smartphone.

Notwithstanding the forgoing, the hubcap lighting system 100 can be any suitable size, shape, and configuration as is known in the art without affecting the overall concept of the invention, provided that it accomplishes the above stated objectives. One of ordinary skill in the art will appreciate that the shape and size of the hubcap lighting system 100 and its various components, as show in the FIGS. are for illustrative purposes only, and that many other shapes and sizes of the hubcap lighting system 100 are well within the scope of the present disclosure. Although dimensions of the hubcap lighting system 100 and its components (i.e., length, width, and height) are important design parameters for good performance, the hubcap lighting system 100 and its various components may be any shape or size that ensures optimal performance during use and/or that suits user need and/or preference. As such, the hubcap lighting system 100 may be comprised of sizing/shaping that is appropriate and specific in regard to whatever the hubcap lighting system 100 is designed to be applied.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A hubcap lighting system for a vehicle wheel, the hubcap lighting system comprising:
   a wheel hub center cap comprising an attachment component adapted to magnetically secure the wheel hub center cap to the vehicle wheel;
   a lighting component adapted to provide illumination external to the wheel hub center cap;
   a solar power component adapted to power the lighting component; and
   a control switch positioned on an exterior surface of the wheel hub center cap configured to turn the lighting component on and off and to control illumination; and
   wherein the solar power component is embedded within an exterior surface of the wheel hub center cap.

2. The hubcap lighting system of claim 1, wherein the lighting component is embedded within an exterior surface of the wheel hub center cap.

3. The hubcap lighting system of claim 1, wherein the lighting component is attached to an exterior surface of the wheel hub center cap.

4. The hubcap lighting system of claim 1, wherein the lighting component is a plurality of light sources.

5. The hubcap lighting system of claim 1, wherein the lighting component emits light in multiple colors.

6. The hubcap lighting system of claim 1, wherein the lighting component comprises a plurality of light emitting diodes.

7. The hubcap lighting system of claim 1, wherein the wheel hub center cap is translucent and the lighting component is attached to a back side surface of the wheel hub center cap.

8. A hubcap lighting system for a vehicle wheel, the hubcap lighting system comprising:
   a hubcap comprising an attachment component adapted to magnetically secure the hubcap to the vehicle wheel;
   a lighting component adapted to provide illumination external to the hubcap; and
   a solar power component adapted to power the lighting component;
   a control switch positioned on an exterior surface of the hubcap configured to turn the lighting component on and off and to control illumination; and
   a wireless remote controller for alternatively activating and deactivating the lighting component; and
   wherein the solar power component is embedded within an exterior surface of the hubcap.

9. The hubcap lighting system of claim 8, wherein the lighting component is a plurality of light sources positioned adjacent to a perimeter of the hubcap.

10. The hubcap lighting system of claim 8, wherein the lighting component is a plurality of light sources arranged in a spoke pattern on the hubcap.

11. The hubcap lighting system of claim 8, wherein the hubcap is translucent and the lighting component is attached to a back side surface of the hubcap.

12. The hubcap lighting system of claim 8, wherein the solar power component comprises a solar cell and a battery.

13. A hubcap lighting system for a vehicle wheel, the hubcap lighting system comprising:
   a hubcap comprising a center opening and an attachment component adapted to magnetically secure the hub cap to the vehicle wheel;
   a wheel hub center cap positional within the center opening of the hubcap;
   a lighting component adapted to provide illumination external to the hubcap and the wheel hub center cap; and
   a solar power component adapted to power the lighting component; and
   a control switch positioned on an exterior surface of the wheel hub center cap configured to turn the lighting component on and off and to control illumination; and
   wherein the solar power component is embedded within an exterior surface of the wheel hub center cap.

14. The hubcap lighting system of claim 13, wherein the lighting component comprises a plurality of light sources positioned on the hubcap and the wheel hub center cap.

* * * * *